United States Patent Office 2,909,541
Patented Oct. 20, 1959

2,909,541

NITROGENOUS THIOMOLYBDATES

Georges Hugel, Ville d'Avray, France, assignor to Institute Français du Petrole des Carburants et Lubrifiants, Rueil-Malmaison, Seine-et-Oise, France No Drawing. Application January 7, 1955
Serial No. 480,611

13 Claims. (Cl. 260—429)

The present invention relates to the synthesis of nitrogen-containing thiomolybdates.

These nitrogen containing thiomolybdates are useful in the embodiment of lubricants containing in solution a sulfur compound of molybdenum which is decomposable, under the influence of the heat liberated by friction between parts in contact, to provide a deposit which fills the irregularities of the said surfaces and protects them against wear, considerably reducing their coefficient of friction. The thiomolybdates of organic bases fulfil these requirements.

The only thiomolybdates of organic bases heretofore prepared have been the thiomolybdates of piperazine and piperidine. These products were prepared by Debucquet and Velluz (Bulletin de la Sté Chimique de France, 1932, 51, 1571) by dissolving molydic acid in an aqueous solution of the base, and then passing a stream of hydrogen sulfide into such solution for 12 to 24 hours. The thiomolydate was obtained in the form of brick-red crystals, by filtering the solution.

The process of preparation according to the present invention is not only more rapid and more economical than the aforesaid prior process, but it also makes it possible to prepare the thiomolybdate of any nitrogen base whatever, thus giving rise to an entire new series of compounds, which are of considerable interest wherever it is desired to produce an insoluble sulfur compound of molybdenum by the thermal decomposition of a solution of a thiomolybdate, and especially in the lubricants field.

The present invention is directed to the preparation not only of the known thiomolydates of nitrogen bases.

The preparation of the thiomolybdates of nitrogen bases is achieved, according to this invention, either by admixing aqueous solutions of sodium thiomolydates and hydrochlorides, sulfates, hydrobromides or other soluble salts of organic bases, or by incorporating the salt of the organic base in the solid state in the thiomolybdate solution in very slight excess over the theoretical quantity. The reaction takes place very rapidly. The thiomolybdates appear in the form of crystals, generally of brick-red color, with the color varying somewhat with the nature of the base. The yields are practically quantitative.

The following examples set forth representative embodiments of the present invention. The percentages are by weight.

Example 1

There are successively prepared a normal solution of sodium thiomolybdate (one mol) in one liter of water and an aqueous bi-normal solution of triethylamine hydrochloride (two mols) in one liter of water. Equal volumes of the two solutions are admixed. There is thus obtained a precipitate of thiomolybdate of triethylamine in the form of crystals of brick-red color.

Analysis by calcination of the organic product leaves a residue of $MoO_3$ corresponding to 33.7% of the molybdate formed. The percentage of $MoO_3$ calculated from the formula $[N(C_2H_5)_3]_2.H_2MoS_4$ is 33.8%, which is extremely close to that actually obtained.

Example 2

The thiomolybdate of heptylamine is prepared in the form of brown-red crystals by double exchange between sodium thiomolybdate (1 mol) and heptylamine hydrochloride (2 mols), after the manner described in Example 1.

Analysis by calcination of the organic product leaves a residue of $MoO_3$ corresponding to 31.5% of the thiomolydate formed. The percentage of $MoO_3$ calculated from the formula $(NH_2C_7H_{15})_2.H_2MoS_4$ is 31.7%, which is extremely close to that actually obtained.

Example 3

The thiomolybdate of methyl-pyridinium is prepared in the form of red crystals by precipitation from a solution of sodium thiomolybdate (one mol) with the theoretical quantity (2 mols) of the sulfate of methylpyridinium, after the manner described in Example 1.

Analysis by calcination of the organic product leaves a residue of $MoO_3$ corresponding to 34.9% of the thiomolybdate formed. The percentage of $MoO_3$ calculated from the formula $(C_6H_8N)_2MoS_4$ is 35.0%, which is extremely close to that actually obtained.

Example 4

The thiomolybdate of hexyl-pyridinium is prepared in the form of red crystals by double exchange between hexyl-pyridinium hydrobromide (2 mols) and sodium thiomolybdate (one mol), after the manner described in Example 1.

Analysis by calcination of the organic product leaves a residue of $MoO_3$ corresponding to 28.3% of the thiomolybdate formed. The percentage of $MoO_3$ calculated from the formula $(C_{11}H_{18}N)_2MoS_4$ is 26.1%, which is very close to that actually obtained.

Example 5

The thiomolybdate of decylene-1, 10-dipyridinium is prepared in the form of red crystals by double exchange between the hydrobromide of decylene-1, 10-dipyridinium (2 mols) and sodium thiomolybdate (one mol), after the manner described in Example 1.

Analysis by calcination of the organic product leaves a residue of $MoO_3$ corresponding to 26.3% of the thiomolybdate formed. The percentage of $MoO_3$ calculated from the formula $C_{20}H_{30}N_2MoS_4$ is 27.6%, which is very close to that actually obtained.

Example 6

The thiomolybdate of hexyl-quinolinium is obtained in the form of red crystals by double exchange between sodium molybdate (one mol) and the hydrobromide of hexyl-quinolinium (2 mols), after the manner described in Example 1.

Analysis by calcination of the organic product leaves a residue of $MoO_3$ corresponding to 23.0% of the thiomolybdate formed. The percentage of $MoO_3$ calculated from the formula $(C_{15}H_{20}N)_2MoS_4$ is 23.1% which is extremely close to that actually obtained.

Example 7

By precipitation of an aqueous solution of sodium thiomolybdate (one mol) with an aqueous solution of decylamine hydrochloride (2 mols), the thiomolybdate of decylamine is obtained in the form of a very luminous orange-colored powder.

After calcination to a dull red heat, a residue of $MoO_3$ remains which corresponds to 27.3% of the thiomolybdate formed. The theoretical figure for such $MoO_3$ residue, calculated from the formula $(NH_2C_{10}H_{21})H_2MoS_4$ is 26.77%.

It will be understood that the invention covers application to thiomolybdates of other organic nitrogen bases than those mentioned, by way of example in the foregoing illustrative examples. Thus other operative thiomolybdates of organic nitrogen bases include among others, the thiomolybdates of:

Octylamine
Dodecylamine
Tetradecylamine
Hexadecylamine
Octadecylamine
Octadecenylamine
Octadecadienylamine
Alkyltrimethyl ammonium
Dialkyl dimethyl ammonium
N-methyloctylamine
N-methyldodecylamine
N-methylhexadecylamine
N-methyldodecylamine
N-methyl dihexadecylamine
N,N-dimethyl octylamine
N,N-dimethyl dodecylamine
N,N-dimethyl hexadecylamine
N,N-diethyl dodecylamine
N,N-diethyl hexadecylamine
N-alkyl pyridinium
N-alkyl picolinium
N-alkyl lutidinium
N-alkyl isoquinolinium
N-alkyl methylquinolinium The thiomolybdates of organic bases are but little soluble in water and in alcohol, solutions in the latter being of yellow orange color. On the other hand, they are soluble in vegetable or animal oils or in oils constituted by a mixture of esters of fatty acids and alcohols, or by a mixture obtained from transesterification of vegetable or animal oils with polyethylene glycol or polypropylene glycol or a higher alcohol, or in the synthetic products from the esterification of mono and polyalcohols with fatty acids or from the esterification of diacids with monoalcohols.

Having thus disclosed the invention, what is claimed is:

1. A thiomolybdate of an amine selected from the group consisting of alkyl amines, alkenyl amines, N-lower alkylated alkyl amines, N-lower alkylated pyridines, and N-lower alkylated quinolines.
2. A thiomolybdate of an alkyl amine containing 2 to 12 carbon atoms.
3. Triethylamino-thiomolybdate.
4. Heptylamino-thiomolybdate.
5. Methyl-pyridinium-thiomolybdate.
6. Hexyl-pyridinium-thiomolybdate.
7. Decylene-1,10-dipyridinium-thiomolybdate.
8. Hexyl-quinolinium-thiomolybdate.
9. Decylamino-thiomolybdate.
10. A method of preparing a thiomolybdate of an amine selected from the group consisting of alkyl amines, alkenyl amines, N-lower alkylated alkyl amines, N-lower alkylated pyridines, and N-lower alkylated quinolines, which comprises precipitating the said thiomolybdate by the precipitating action of a soluble salt of the corresponding amine on an aqueous solution of sodium thiomolybdate.
11. A method of preparing a thiomolybdate of an amine selected from the group consisting of alkyl amines, alkenyl amines, N-lower alkylated alkyl amines, N-lower alkylated pyridines, and N-lower alkylated quinolines, which comprises precipitating the said thiomolybdate by the precipitating action of a sulfate of the corresponding amine on an aqueous solution of sodium thiomolybdate.
12. A method of preparing a thiomolybdate of an amine selected from the group consisting of alkyl amines, alkenyl amines, N-lower alkylated alkyl amines, N-lower alkylated pyridines, and N-lower alkylated quinolines, which comprises precipitating the said thiomolybdate by the precipitating action of a hydrobromide of the corresponding amine on an aqueous solution of sodium thiomolybdate.
13. A method of preparing a thiomolybdate of an amine selected from the group consisting of alkyl amines, alkenyl amines, N-lower alkylated alkyl amines, N-lower alkylated pyridines, and N-lower alkylated quinolines, which comprises precipitating the said thiomolybdate by the precipitating action of a hydrochloride of the corresponding amine on an aqueous solution of sodium thiomolybdate.

References Cited in the file of this patent

UNITED STATES PATENTS

| | | |
|---|---|---|
| 2,220,042 | Hill | Oct. 29, 1940 |
| 2,346,156 | Farrington et al. | Apr. 11, 1944 |
| 2,348,317 | Waugh | May 9, 1944 |
| 2,649,445 | Speeter | Aug. 18, 1953 |
| 2,654,770 | Herman | Oct. 6, 1953 |
| 2,798,103 | Schaeffer et al. | July 2, 1957 |

OTHER REFERENCES

Debucquet et al.: Bulletin de la Sté Chimique de France, 1932, 51, 1571.

Spacu: "Bulletin de la Section Scientifique" (Academe Roumaine), vols. 19–21, pages 188–198 (1937–1939); page 188 relied on.